United States Patent

Watai

[11] 3,983,315
[45] Sept. 28, 1976

[54] ELECTROMAGNETIC COUNTER CIRCUIT
[75] Inventor: Yuji Watai, Tokyo, Japan
[73] Assignee: Xerox Corporation, Stamford, Conn.
[22] Filed: Sept. 5, 1975
[21] Appl. No.: 610,607

[30] Foreign Application Priority Data
Nov. 27, 1974    Japan .............................. 49-142752

[52] U.S. Cl. .............................. 178/6; 178/DIG. 36; 58/145 R
[51] Int. Cl.² .......................................... H04N 1/32
[58] Field of Search ..................... 178/6, DIG. 36, 5; 58/145 R, 145 K

[56] References Cited
UNITED STATES PATENTS

| | | | |
|---|---|---|---|
| 2,855,993 | 10/1958 | Rahmel | 58/145 R |
| 3,538,258 | 11/1970 | Zuckerman | 58/145 R |
| 3,882,670 | 5/1975 | Woolley | 58/145 K |

Primary Examiner—Robert L. Griffin
Assistant Examiner—Edward L. Coles

[57] ABSTRACT

For automatically gathering the data necessary to quantify and qualify the usage of a facsimile transceiver, there is a data collecting device having a pair of electromechanical counters which are driven by separate capacitive-type pulse generators in response to a DC control current for the transceiver to register running counts corresponding to respective ones of (1) the total number of operating cycles on the transceiver, (2) the accumulated number of cycles devoted to operation of the transceiver in a transmit mode, and (3) the accumulated number of cycles devoted to operation of the transceiver in a receive mode.

6 Claims, 1 Drawing Figure

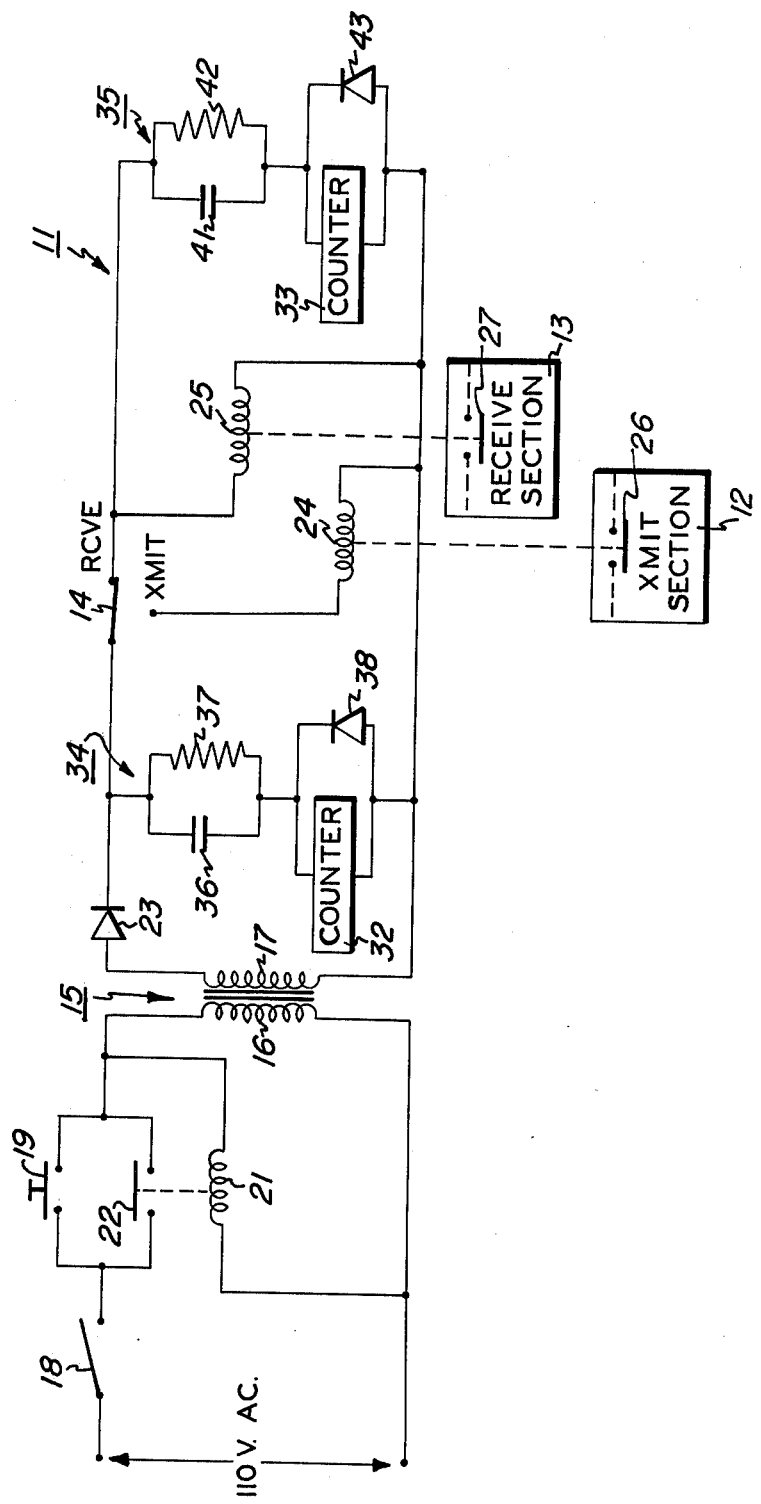

ELECTROMAGNETIC COUNTER CIRCUIT

BACKGROUND OF THE INVENTION

This invention relates to facsimile transceivers and, more particularly, to methods and means for quantifying and qualifying the usage of such transceivers.

Information pertaining to the accumulated number of operating cycles on a facsimile transceiver has substantial value, especially if it is allocatable to separately show transmissions and receptions. For example, data of that type may be used to advantage in executing routine maintenance schedules, carrying out troubleshooting procedures, and preparing user application studies. Unfortunately, however, manpower and equipment costs are an overriding consideration if such information is to be relied on in the ordinary course.

SUMMARY OF THE INVENTION

Accordingly, an object of this invention is to provide economical and reliable methods and means for tracking the usage and the pattern of usage of a facsimile transceiver. More pointedly, an object is to provide a data collecting device which may be used with new or existing transceivers to automatically gather the data necessary to quantify and qualify the usage of the transceiver.

Briefly, to carry out these and other objects of the invention, a facsimile transceiver is equipped with a data collection device having a pair of counters to separately register respective ones of (1) the total number of operating cycles on the transceiver, (2) the accumulated number of cycles devoted to operation of the transceiver in a transmit mode, and (3) the accumulated number of cycles devoted to operation of the transceiver in a receive mode. As a general rule, any two of those counts is sufficient to quantify and qualify the usage of the transceiver since they normally fully define the third one. To minimize the equipment costs, electromechanical counters are used, and the drive pulses for those counters are provided by capacitive-type pulse generators in response to a DC control current provided for the transceiver.

BRIEF DESCRIPTION OF THE DRAWING

Still further objects and advantages of this invention will become apparent when the following detailed description is read in conjunction with the attached drawing, in which the sole FIGURE is a simplified schematic diagram of a facsimile transceiver equipped with a data collecting device embodying the present invention.

DETAILED DESCRIPTION OF THE ILLUSTRATED EMBODIMENT

While the invention is described in some detail hereinbelow with reference to a single embodiment, it is to be understood that there is no desire to limit it to the embodiment. On the contrary, the intent is to cover all modifications, alternatives, and equivalents falling within the spirit and scope of the invention as defined by the appended claims.

Turning now to the drawing, it will be seen that there is a facsimile transceiver 11 (shown only in relevant part) having a transmitter section 12 and a receiver section 13 which are selectively activated under the control of a mode selector switch 14 for operation in a transmit mode and a receive mode, respectively.

In keeping with accepted practices, power is applied to the transceiver 11 via a power transformer 15 which has a primary winding 16 and a secondary winding 17. An on-off switch 18 and a data switch 19 are connected in series with the primary winding 16 for selectively coupling that winding across, say, the commercial power mains. Typically, the switches 18 and 19 are operated sequentially — viz, the on-off switch 18 is closed first to place the transceiver 11 in a standby state, and then the data switch 19 is closed to activate the transceiver 11 after it has been confirmed that there is a remote facsimile terminal (not shown) which is ready to communicate. As shown, the data switch 19 is a momentary type. Hence, there is a relay coil 21 connected in parallel with the transformer primary winding 16 to close a set of contacts 22 in a parallel holding circuit for the data switch 19 once the transmitter has been activated.

A diode 23 is connected in series with the secondary winding 17 of the transformer 15 to convert the AC voltage, which is induced into that winding when the transceiver 11 is activated, into a pulsating DC control current through a half wave rectification process. The mode selector switch 14 routes that current to a transmit relay coil 24 or a receive relay coil 25 to enable the transmitter section 12 or the receiver section 13 of the transceiver 11. Specifically, if the selector switch 14 is positioned for a transmit mode of operation, the control current energizes the relay coil 24, thereby closing a first set of contacts 26 to enable the transmitter section 12. Conversely, if the mode selector switch 14 is set for operation in a receive mode, the control current energizes the other relay coil 25, thereby closing another set of contacts 27 to enable the receiver section 13.

In accordance with the present invention, the transceiver 21 is equipped with a data collection device having a pair of electromagnetic counters 32 and 33 which are driven in response to the aforementioned DC control current to register running counts corresponding to respective ones of (1) the total number of operating cycles on the transceiver, (2) the accumulated number of cycles devoted to operation of the transceiver in its transmit mode, and (3) the accumulated number of cycles devoted to operation of the transceiver in its receive mode. One of the more important features of the invention is that there are separate capacitive-type pulse generators 34 and 35 which respond to the DC control current to provide pulses of predetermined amplitude and duration for incrementing the counters 32 and 33, respectively. Therefore, the counters 32 and 33 may be selected to have ratings which are closely matched to the normal characteristics of the incrementing pulses, without undue risk of being overdriven or otherwise damaged.

More particularly, as illustrated, the counter 32 registers a running count corresponding to the total number of operating cycles on the transceiver 11. To that end, the counter 32 and the pulse generator 34 are connected in series across the supply source for the DC control current (i.e., the transformer secondary winding 17 and the diode 23), independently of the mode detector switch 14. In keeping with this invention, the pulse generator 34 has a capacitor 56 and a parallel resistor 37 to define the path for series current flow through the counter 32. Each time the transceiver 11 is activated, the capacitor 36 charges at a predetermined rate in response to current drawn through the counter 32, until the voltage across the capacitor 36 reaches a limiting level determined by the voltage developed across the transformer secondary winding 17 minus the small forward voltage drop of the diode 23. Thus, an incrementing pulse of predetermined amplitude and duration is coupled through the capacitor 36 to the counter 32. Subsequently, when the transceiver 11 is deactivated, the capacitor 36 is discharged in response to current drawn through the resistor 37. Desirably, of course, a free wheeling diode 38 or the like is connected in parallel with the counter 32 to limit the back emf developed thereacross.

The counter 33, on the other hand, registers a running count corresponding to the accumulated number of cycles which are devoted to operation of the transceiver 11 in its receive mode. To accomplish that, it is connected in series with the pulse generator 35 across the receive relay coil 25 so that an incrementing pulse of predetermined amplitude and duration is applied to the counter 33 each time the transceiver 11 is activated while the mode detector switch 14 is in its receive position. Again, the pulse generator 35 comprises a capacitor 41 and a parallel resistor 42 to provide the incrementing pulse. Also, a free wheeling diode 43 is connected in parallel with the counter 33 to limit the back emf developed thereacross.

CONCLUSION

In view of the foregoing, it will now be appreciated that the present invention provides an economical and reliable data collecting device for automatically gathering the data necessary to quantify and qualify the usage of a facsimile transceiver.

What is claimed is:

1. A data collection device for automatically gathering quantitative and qualitative usage information from a facsimile transceiver; said transceiver including a first control circuit, a second control circuit, means for supplying a DC control current when said transceiver is activated, and a mode selector switch for selectively applying said control current to said first control circuit for conditioning said transceiver to operate in a transmit mode or to said second control circuit for conditioning said transceiver to operate in a receive mode; said data collecting device comprising a pair of counters, a first capacitive-type pulse generator connected in series with one of said counters for supplying a pulse of predetermined amplitude and duration in response to said control current to increment said counter upon the occurrence of a first event, and a second capacitive-type pulse generator connected in series with the other of said counters for supplying another pulse of predetermined amplitude and duration in response to said control current upon the occurrence of a second event; said first and second events being respective ones of actuation of said transceiver, operation of said transceiver in a transmit mode, and operation of said transceiver in a receive mode, whereby said counters register running counts permitting the usage of said transceiver to be quantitatively and qualitatively tracked.

2. The data collection device of claim 1 wherein said counters are electromechanical units, and said pulse generators each have a path for series current flow defined by a capacitor and a parallel resistor.

3. The data collection device of claim 2 wherein said transceiver further includes a power transformer having a primary winding and a secondary winding, means for coupling said primary winding across an AC source to actuate said transceiver, and a half wave rectifier coupled to said secondary winding for providing said DC control current.

4. The data collection device of claim 1 wherein said one counter and said first pulse generator are connected in series across said current supply means, independently of said mode selector switch, whereby said one counter registers a count corresponding to the total number of times said transceiver has been activated; and said other counter and said pulse generator are connected in series across one of said control circuits, whereby said other counter registers a count corresponding to the number of times said transceiver has been activated for operation in a predetermined one of said modes.

5. The data collection device of claim 4 wherein said transceiver further includes a power transformer having a primary winding and a secondary winding, means for coupling said primary winding across an AC source to actuate said transceiver and a diode connected in series with said secondary winding to provide said DC control current.

6. The data collection device of claim 5 wherein said counters are electromechanical units, and said pulse generators each have a path for series current flow defined by a capacitor and a parallel resistor.

* * * * *

UNITED STATES PATENT AND TRADEMARK OFFICE
CERTIFICATE OF CORRECTION

PATENT NO. : 3,983,315
DATED : September 28, 1976
INVENTOR(S) : Yuji Watai

It is certified that error appears in the above-identified patent and that said Letters Patent are hereby corrected as shown below:

Column 2, line 64, "56" should read --36--.

*Signed and Sealed this*

Twenty-second *Day of* March 1977

[SEAL]

Attest:

RUTH C. MASON
*Attesting Officer*

C. MARSHALL DANN
*Commissioner of Patents and Trademarks*